United States Patent
Yang (10) Patent No.: US 11,973,721 B2
(45) Date of Patent: *Apr. 30, 2024

(54) ACTIVATION CONTROL METHOD, USER EQUIPMENT AND NETWORK DEVICE

(71) Applicant: VIVO MOBILE COMMUNICATION CO., LTD., Guangdong (CN)

(72) Inventor: Xiaodong Yang, Guangdong (CN)

(73) Assignee: VIVO MOBILE COMMUNICATION CO., LTD., Guangdong (CN)

(*) Notice: Subject to any disclaimer, the term of this patent is extended or adjusted under 35 U.S.C. 154(b) by 0 days.

This patent is subject to a terminal disclaimer.

(21) Appl. No.: 17/894,241

(22) Filed: Aug. 24, 2022

(65) Prior Publication Data

US 2022/0407665 A1    Dec. 22, 2022

Related U.S. Application Data

(63) Continuation of application No. 16/650,900, filed as application No. PCT/CN2018/104287 on Sep. 6, 2018, now Pat. No. 11,456,844.

(30) Foreign Application Priority Data

Sep. 26, 2017 (CN) .......................... 201710883091.1

(51) Int. Cl.
*H04L 5/00* (2006.01)
*H04W 28/06* (2009.01)
(Continued)

(52) U.S. Cl.
CPC .......... *H04L 5/0098* (2013.01); *H04L 5/0053* (2013.01); *H04W 28/06* (2013.01); *H04W 72/0453* (2013.01); *H04W 72/23* (2023.01)

(58) Field of Classification Search
CPC . H04W 72/23; H04W 56/00; H04W 72/0453; H04W 28/06; H04L 5/0098; H04L 5/0053
See application file for complete search history.

(56) References Cited

U.S. PATENT DOCUMENTS 11,456,844 B2 * 9/2022 Yang ................. H04W 72/0453
2011/0243106 A1   10/2011 Hsu et al.
(Continued)

FOREIGN PATENT DOCUMENTS

CN       102625359 A     8/2012
CN       103313375 A     9/2013
(Continued)

OTHER PUBLICATIONS

Extended European Search Report for Application No. 18861124.8-1220, dated Oct. 12, 2020, 8 Pages.
(Continued)

*Primary Examiner* — Pankaj Kumar
*Assistant Examiner* — Kenneth P Hunt
(74) *Attorney, Agent, or Firm* — BROOKS KUSHMAN P.C.

(57) ABSTRACT

The present disclosure provides an activation control method, a user equipment and a network device. The method includes: receiving configuration information transmitted by a network device, where the configuration information is used to indicate at least one of a transmission resource and an operation attribute; when the transmission resource and/or the operation attribute are configured for a target object, performing a deactivation function operation on the target object. The target object is a cell, a carrier or a bandwidth part (BWP).

19 Claims, 3 Drawing Sheets

(51) Int. Cl.
*H04W 72/04* (2023.01)
*H04W 72/0453* (2023.01)
*H04W 72/14* (2009.01)
*H04W 72/23* (2023.01)

(56) References Cited

U.S. PATENT DOCUMENTS

| | | | |
|---|---|---|---|
| 2015/0003373 A1 | 1/2015 | Zhao et al. | |
| 2016/0128003 A1 | 5/2016 | Callender et al. | |
| 2017/0332358 A1* | 11/2017 | Park | H04L 1/1671 |
| 2018/0042016 A1* | 2/2018 | Babaei | H04W 72/23 |
| 2018/0220440 A1* | 8/2018 | Dudda | H04W 72/23 |

FOREIGN PATENT DOCUMENTS

| | | |
|---|---|---|
| CN | 105338635 A | 2/2016 |
| EP | 3668221 A1 | 6/2020 |
| WO | 2015103882 A1 | 7/2015 |

OTHER PUBLICATIONS

International Search Report and Written Opinion for Application No. PCT/CN2018/104287, dated Nov. 22, 2018, 9 Pages.
Non-final Rejection for U.S. Appl. No. 16/650,900, dated Aug. 16, 2021, 11 Pages.
Vivo, "UL Grant-free Transmission," 3GPP TSG-RAN WG2 Meeting #98, Agenda item 10.3.1.7, May 15-19, 2017, R2-1705305, Hangzhou, China, 3 Pages.

* cited by examiner

ACTIVATION CONTROL METHOD, USER EQUIPMENT AND NETWORK DEVICE

CROSS-REFERENCE TO RELATED APPLICATIONS

This application is a continuation of U.S. patent application Ser. No. 16/650,900 filed on Mar. 26, 2020, which is the U.S. national phase of PCT Application PCT/CN2018/104287 filed on Sep. 6, 2018, which claims priority to Chinese Application No. 201710883091.1, filed on Sep. 26, 2017, which are incorporated herein by reference in their entireties.

TECHNICAL FIELD

The present disclosure relates to the field of communication technologies, and in particular to an activation control method, a user equipment and a network device.

BACKGROUND

In the Long Term Evolution (LTE) system, when a user equipment (UE) transmits uplink data, the UE transmits the uplink data on uplink resources granted and scheduled in real time by a network device in a uplink scheduling grant mode. In other words, before the current UE transmits the uplink data, the UE needs to receive an uplink grant message transmitted by the network device and then transmits uplink data on uplink resources indicated by the uplink grant message. In this way, the UE transmits the uplink data only after receiving the uplink grant message transmitted by the network device, resulting in large data delays and large signaling overhead.

In order to reduce the delay and the signaling overhead, the fifth generation (5G) mobile communication system supports the UE to transmit uplink data in a uplink scheduling grant-free manner, that is, the UE can transmit uplink data without an uplink grant message transmitted by the network device.

Compared with the mobile communication systems in the related art, the future 5G mobile communication system needs to adapt to more diverse scenarios and service requirements. Main scenarios of New Radio (NR) include Enhanced Mobile Broadband (eMBB), Massive Machine Type of Communication (mMTC), and Ultra-Reliable and Low Latency Communications (URLLC), and these scenarios put forward high reliability, low latency, large bandwidth, wide coverage and other requirements for the system. For certain scenarios, low latency and highly reliable transmission are required. For such service requirements, the NR supports grant-free mode, to reduce signaling interaction procedures and ensure low latency requirements.

In the related art, a Scell and a bandwidth part (BWP) can be deactivated, and there is a physical downlink control channel (PDCCH) loss problem. The PDCCH scheduling may extend a Scell deactivation timer. If the PDCCH is lost, the Scell deactivation timer is not extended, and then the Scell is deactivated when the timer expires. As a result, uplink transmission of the UE cannot be transmitted, and thus the uplink transmission of the UE may be delayed.

SUMMARY

One embodiment of the present disclosure provides an activation control method including:

receiving configuration information transmitted by a network device, wherein the configuration information is used to indicate at least one of a transmission resource and an operation attribute;

when the transmission resource and/or the operation attribute are configured for a target object, performing a deactivation function operation on the target object; wherein the target object is a cell, a carrier or a bandwidth part (BWP).

One embodiment of the present disclosure further provides an activation control method including:

transmitting indication information to a user equipment (UE); wherein the indication information includes at least one of a transmission resource and an operation attribute, the indication information is used to indicate the user equipment to perform a deactivation function operation on the target object when the transmission resource and/or the operation attribute are configured for the target object, and the target object is a cell, a carrier or a BWP.

One embodiment of the present disclosure further provides a user equipment including:

a receiving module used to receive configuration information transmitted by a network device, wherein the configuration information is used to indicate at least one of a transmission resource and an operation attribute;

a processing module used to perform a deactivation function operation on the target object when the transmission resource and/or the operation attribute are configured for a target object, wherein the target object is a cell, a carrier or a BWP.

One embodiment of the present disclosure further provides a network device including:

an indication information transmission module used to transmit indication information to a user equipment (UE), wherein the indication information includes at least one of a transmission resource and an operation attribute, the indication information is used to indicate the user equipment to perform a deactivation function operation on the target object when the transmission resource and/or the operation attribute are configured for the target object, and the target object is a cell, a carrier or a BWP.

One embodiment of the present disclosure further provides a user equipment including:

one or more processors;
a memory; and
one or more programs; wherein the one or more computer programs are stored in the memory and configured to be executed by the one or more processors, the computer program is executed to implement steps of the above method.

One embodiment of the present disclosure further provides a network device including:

one or more processors;
a memory; and
one or more programs; wherein the one or more computer programs are stored in the memory and configured to be executed by the one or more processors, the computer program is executed to implement steps of the above method.

One embodiment of the present disclosure further provides a computer readable storage medium including a computer program stored thereon; wherein the computer program is executed by a processor to implement the steps of the above method.

BRIEF DESCRIPTION OF THE DRAWINGS

To describe technical solutions of embodiments in the application more clear, brief descriptions of the drawings used for depicting embodiments of the application will be put forward in the following. It is obvious that, the drawings described in the following are only some embodiments of the application. For persons having ordinary skill in the art, other drawings may be obtained from these drawings without creative work.

DETAILED DESCRIPTION

The technical solutions in the embodiments of the present disclosure are clearly and completely described in the following with reference to the accompanying drawings in the embodiments of the present disclosure. It is apparent the embodiments in the following description are merely a part rather than all of the embodiments of this disclosure. All other embodiments obtained by a person of ordinary skill in the art based on the embodiments of this disclosure without creative efforts shall fall within the scope of this disclosure.

Figure 1:
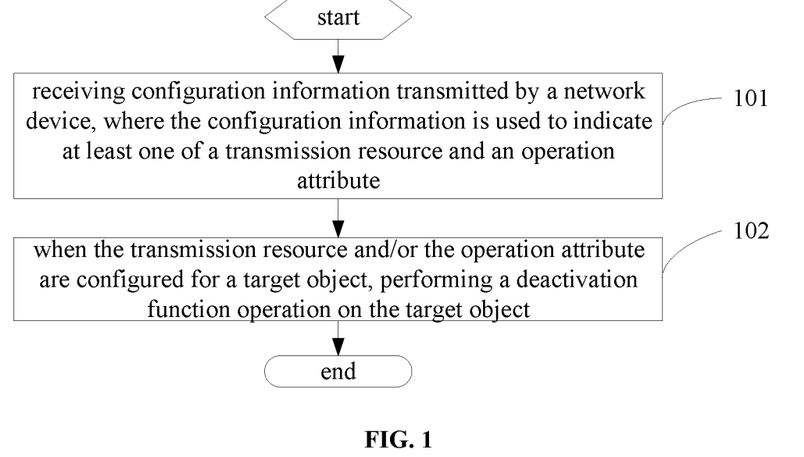
FIG. 1 is a first flowchart of an activation control method according to an embodiment of the present disclosure.

Referring to FIG. 1, FIG. 1 is a flowchart of an activation control method according to an embodiment of the present disclosure. As shown in FIG. 1, the method includes the following steps.

Step 101: receiving configuration information transmitted by a network device, where the configuration information is used to indicate at least one of a transmission resource and an operation attribute.

The activation control method provided in the embodiment of the present disclosure is mainly applied to a user equipment, and is used to control activation and deactivation states of a cell, a carrier or a BWP.

In this step, the above transmission resource includes an uplink transmission resource or a downlink transmission resource. According to the indication of the network device, the user equipment configures, allocates or activates at least one of the transmission resource and the operation attribute. The operation attribute is used to set UL skip mechanism, and includes an uplink skip attribute and a non-uplink skip attribute. Specifically, the uplink skip attribute refers to not transmitting on the transmission resource when the user equipment has no uplink data to be transmitted during uplink scheduling transmission. The non-uplink skip attribute refers to transmitting a preset invalid value on the transmission resource when the user equipment has no uplink data to be transmitted during uplink scheduling transmission.

Step 102: when the transmission resource and/or the operation attribute are configured for a target object, performing a deactivation function operation on the target object.

In this step, the target object is a cell, a carrier or a BWP. In this embodiment, the activation or deactivation operation may be performed on an activation object which may be the cell, the carrier or the BWP. The performing a deactivation function operation on the target object may include: performing a deactivation function operation on the cell, the carrier or the BWP. That is, when a deactivation condition is met, the user equipment performs a deactivation operation on the cell, the carrier or the BWP. The deactivation condition may be a deactivation timeout or receiving a deactivation command. That is, in this embodiment, if the cell is taken as the activation target, when the cell includes the configured transmission resource, the deactivation function operation may be performed on the cell. If the carrier is taken as the activation object, when the carrier includes the configured transmission resource, the deactivation function operation may be performed on the carrier. If the BWP is taken as the activation object, when the BWP includes the configured transmission resource, the deactivation function operation may be performed on the BWP. It should be understood that, in this embodiment, according to the transmission resource and/or the operation attribute configured by the network side, the user equipment may actively perform the deactivation function operation on the target object according to the pre-agreement, or may perform the deactivation function operation on the target object according to the indication of the network device.

Thus, in this embodiment, the configuration information transmitted by the network device is received, the configuration information is used to indicate at least one of a transmission resource and an operation attribute; if the transmission resource and/or the operation attribute are configured for the target object, deactivation function operation is performed on the target object, where the target object is the cell, the carrier or the BWP. Because the deactivation function performed on the cell, the carrier or the BWP can be limited by the transmission resources, this can effectively avoid the problem that if the PDCCH is lost, deactivation time of the cell, the carrier or the BWP expires and then a wrong deactivation operation is triggered, resulting delay in uplink transmission of the user equipment.

It should be understood that types of transmission resources may be set according to actual needs. For example, in this embodiment, the transmission resource includes a semi-static resource and/or a grant-free resource. In addition, the above operation attribute is used to set the UL skip mechanism. In this embodiment, the above operation attribute is an uplink skip attribute. In this embodiment, when the transmission resource is a semi-static resource, the target object can be configured as UL Skip according to the above uplink skip attribute. That is, when transmitting data in a semi-static resource, if there is no data transmission, transmission on the resource can be directly skipped without data transmission. Further, the above transmission resource further includes a dynamic scheduling resource. When the transmission resource is a dynamic scheduling resource, the target object or the user equipment needs to be configured as UL Skip for limiting deactivation mechanism of the target object.

In this embodiment, Skip may be configured for the target object, or Skip may be configured for the user equipment. The above performing a deactivation function operation on the target object includes:

performing a deactivation function operation on all target objects configured as Skip; or, performing a deactivation function operation on all target objects of the user equipment.

In this embodiment, when the user equipment configures the target object as Skip, the deactivation function operation may be performed on all target objects configured as Skip. When the user equipment configures itself as Skip, the deactivation function operation may be performed on all target objects of the user equipment. Specifically, the user equipment may configure corresponding target object or the user equipment itself as the Skip, according to the predefinition or the pre-agreement, or configure corresponding target object or the user equipment itself as the Skip, according to the indication of the network device, which is not further limited herein.

It should be noted that changing manners of the deactivation mechanism of the target object may be set according to actual needs. In the embodiment of the present disclosure, the above performing a deactivation function operation on the target object includes any one of the following:

configuring a value of a deactivation timer for the target object as infinity;
shielding a deactivation operation triggered for the target object when the deactivation timer expires;
the deactivation timer not applicable to the target object;
configuring the target object to not allow deactivation;
extending or restarting the deactivation timer according to newly transmitted data and/or retransmitted data in the transmission resource.

In this embodiment, when configuring the value of the deactivation timer for the target object as infinity, the deactivation timer will not run over and deactivation time will not expire. Thus, when PDCCH is lost, deactivation will not be triggered for the target object, thereby ensuring that the uplink transmission will not be delayed due to the deactivation of the target object.

When the user equipment is configured to shield a deactivation operation triggered for the target object when the deactivation timer expires, the deactivation timer runs normally. When PDCCH is lost, the deactivation time expires and then generates a trigger to perform deactivation operation on the target object. As this point, the deactivation operation is shielded, so that the target object is not deactivated, thereby ensuring that the uplink transmission will not be delayed due to the deactivation of the target object.

When the deactivation timer is not applicable to the target object, the deactivation timer may be controlled to not perform timing operation, thereby preventing the target object from being deactivated when the PDCCH is lost.

When the target object is configured to not allow deactivation, the target object is not deactivated under any circumstances. Thus, when PDCCH is lost, the target object is not deactivated, thereby ensuring that the uplink transmission will not be delayed due to the deactivation of the target object. In this manner, configuring the target object to not allow deactivation may further include: configuring the user equipment to shield deactivation operation for the target object in a received deactivation command. That is, no matter whether the deactivation command generated when deactivation time expires out or the deactivation command transmitted by the network device, is received, the user equipment does not perform the deactivation operation on the target object. The deactivation command transmitted by the network device may be transmitted through medium access control (MAC) control element (CE) or physical downlink control channel.

When the user equipment is configured to extend or restart the deactivation timer according to newly transmitted data and/or retransmission data in the transmission resource, the transmission resource is not an uplink Skip transmission resource, that is, the deactivation timer is extended or restarted only when there is data for transmission. For example, in this embodiment, a time-out period of the deactivation timer is defined to be 10 ms. After the deactivation timer is started, the user equipment detects whether data is received or transmitted. If the data is received or transmitted at 5 ms, the deactivation timer is extended or restarted. When the deactivation timer is extended, the time-out period of the deactivation timer is adjusted to be 15 ms. When the deactivation timer is restarted, the deactivation timer is restarted from 0 ms. Since the deactivation timer is extended or restarted when transmitting data on the above transmission resource, it is ensured that the uplink transmission is not delayed due to the deactivation of the target object.

Figure 2:
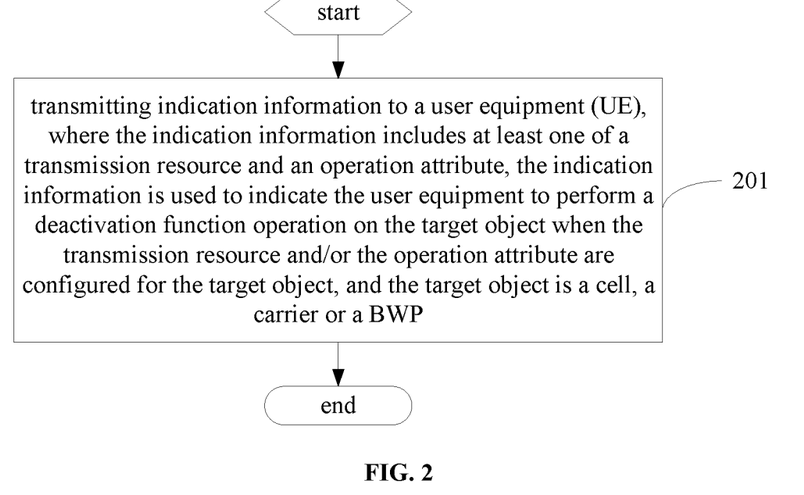
FIG. 2 is a second flowchart of an activation control method according to an embodiment of the present disclosure.

Further, referring to FIG. 2, FIG. 2 is a flowchart of an activation control method according to an embodiment of the present disclosure. As shown in FIG. 2, the method includes the following steps.

Step 201: transmitting indication information to a user equipment (UE), where the indication information includes at least one of a transmission resource and an operation attribute, the indication information is used to indicate the user equipment to perform a deactivation function operation on the target object when the transmission resource and/or the operation attribute are configured for the target object, and the target object is a cell, a carrier or a BWP.

The activation control method provided in the embodiment of the present disclosure is mainly applied to a network device, and is used to control activation and deactivation states of a cell, a carrier or a BWP.

In this step, the above transmission resource includes an uplink transmission resource or a downlink transmission resource. According to the indication of the network device, the user equipment configures, allocates or activates at least one of the transmission resource and the operation attribute. The operation attribute is used to set UL skip mechanism, and includes an uplink skip attribute and a non-uplink skip attribute. Specifically, the uplink skip attribute refers to not transmitting on the transmission resource when the user equipment has no uplink data to be transmitted during uplink scheduling transmission. The non-uplink skip attribute refers to transmitting a preset invalid value on the transmission resource when the user equipment has no uplink data to be transmitted during uplink scheduling transmission.

In this embodiment, the activation or deactivation operation may be performed on an activation object which may be the cell, the carrier or the BWP. The performing a deactivation function operation on the target object may include: performing a deactivation function operation on the cell, the carrier or the BWP. That is, when a deactivation condition is met, the user equipment performs a deactivation operation on the cell, the carrier or the BWP. The deactivation condition may be a deactivation timeout or receiving a deactivation command. That is, in this embodiment, if the cell is taken as the activation target, when the cell includes the configured transmission resource, the deactivation function operation may be performed on the cell. If the carrier is taken as the activation object, when the carrier includes the configured transmission resource, the deactivation function operation may be performed on the carrier. If the BWP is taken as the activation object, when the BWP includes the configured transmission resource, the deactivation function operation may be performed on the BWP.

Thus, in this embodiment, the indication information is transmitted to the user equipment, and the indication information includes at least one of the transmission resource and the operation attribute, the indication information is used to indicate the user equipment to perform a deactivation function operation on the target object when the transmission resource and/or the operation attribute are configured for the target object, and the target object is a cell, a carrier or a BWP. Since the network device can indicate the deactivation function performed by the user equipment on the cell, the carrier or the BWP according to the transmission resource, this can effectively avoid the problem that if the PDCCH is lost, deactivation time of the cell, the carrier or the BWP expires and then a wrong deactivation operation is triggered, resulting delay in uplink transmission of the user equipment.

It should be understood that types of transmission resources may be set according to actual needs. For example, in this embodiment, the transmission resource includes a semi-static resource and/or a grant-free resource. In addition, the above operation attribute is used to set the UL skip mechanism. In this embodiment, the above operation attribute is an uplink skip attribute. In this embodiment, when the transmission resource is a semi-static resource, the target object can be configured as UL Skip according to the above uplink skip attribute. That is, when transmitting data in a semi-static resource, if there is no data transmission, transmission on the resource can be directly skipped without data transmission. Further, the above transmission resource further includes a dynamic scheduling resource. When the transmission resource is a dynamic scheduling resource, the target object or the user equipment needs to be configured as UL Skip for limiting deactivation mechanism of the target object.

In this embodiment, Skip may be configured for the target object, or Skip may be configured for the user equipment. The indicating the user equipment to perform a deactivation function operation on the target object includes:
  indicating the user equipment to perform a deactivation function operation on all target objects configured as Skip; or
  indicating the user equipment to perform a deactivation function operation on all target objects.

In this embodiment, when the user equipment configures the target object as Skip, the deactivation function operation may be performed on all target objects configured as Skip. When the user equipment configures itself as Skip, the deactivation function operation may be performed on all target objects of the user equipment. Specifically, the user equipment may configure corresponding target object or the user equipment itself as the Skip, according to the predefinition or the pre-agreement, or configure corresponding target object or the user equipment itself as the Skip, according to the indication of the network device, which is not further limited herein.

It should be noted that changing manners of the deactivation mechanism of the target object may be set according to actual needs. In the embodiment of the present disclosure, the above indicating the user equipment to perform a deactivation function operation on the target object includes any one of the following:
  indicating the user equipment to configure a value of a deactivation timer for the target object as infinity;
  indicating the user equipment to shield a deactivation operation triggered for the target object when the deactivation timer expires;
  the deactivation timer not applicable to the target object;
  indicating the user equipment to configure the target object to not allow deactivation;
  indicating the user equipment to extend or restart the deactivation timer according to newly transmitted data and/or retransmitted data in the transmission resource.

In this embodiment, when indicating the user equipment to configure the value of the deactivation timer for the target object as infinity, the deactivation timer will not run over and deactivation time will not expire. Thus, when PDCCH is lost, deactivation will not be triggered for the target object, thereby ensuring that the uplink transmission will not be delayed due to the deactivation of the target object.

When the user equipment is indicated to shield a deactivation operation triggered for the target object when the deactivation timer expires, the deactivation timer runs normally. When PDCCH is lost, the deactivation time expires and then generates a trigger to perform deactivation operation on the target object. As this point, the deactivation operation is shielded, so that the target object is not deactivated, thereby ensuring that the uplink transmission will not be delayed due to the deactivation of the target object.

When the deactivation timer is not applicable to the target object, the deactivation timer may be controlled to not perform timing operation, thereby preventing the target object from being deactivated when the PDCCH is lost.

When the user equipment is indicated to configure the target object to not allow deactivation, the target object is not deactivated under any circumstances. Thus, when PDCCH is lost, the target object is not deactivated, thereby ensuring that the uplink transmission will not be delayed due to the deactivation of the target object. In this manner, indicating the user equipment to configure the target object to not allow deactivation may further include: indicating the user equipment to shield deactivation operation for the target object in a received deactivation command. That is, no matter whether the deactivation command generated when deactivation time expires out or the deactivation command transmitted by the network device, is received, the user equipment does not perform the deactivation operation on the target object. The deactivation command transmitted by the network device may be transmitted through medium access control (MAC) control element (CE) or physical downlink control channel.

When the user equipment is configured to extend or restart the deactivation timer according to newly transmitted data and/or retransmission data in the transmission resource, the transmission resource is not an uplink Skip transmission resource, that is, the deactivation timer is extended or restarted only when there is data for transmission. For example, in this embodiment, a time-out period of the deactivation timer is defined to be 10 ms. After the deactivation timer is started, the user equipment detects whether data is received or transmitted. If the data is received or transmitted at 5 ms, the deactivation timer is extended or restarted. When the deactivation timer is extended, the time-out period of the deactivation timer is adjusted to be 15 ms. When the deactivation timer is restarted, the deactivation timer is restarted from 0 ms. Since the deactivation timer is extended or restarted when transmitting data on the above transmission resource, it is ensured that the uplink transmission is not delayed due to the deactivation of the target object.

Figure 3:
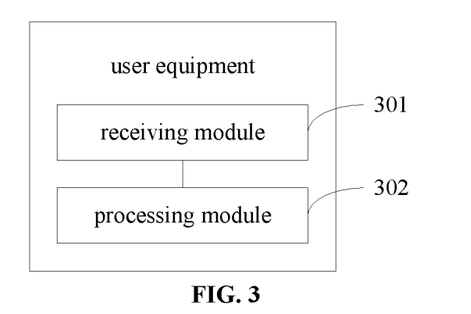
FIG. 3 is a first diagram of a user equipment according to an embodiment of the present disclosure.

Referring to FIG. 3, one embodiment of the present disclosure further provides a user equipment, and the user equipment includes:
  a receiving module 301 used to receive configuration information transmitted by a network device, where the configuration information is used to indicate at least one of a transmission resource and an operation attribute;
  a processing module 302 used to perform a deactivation function operation on the target object when the transmission resource and/or the operation attribute are configured for a target object, where the target object is a cell, a carrier or a BWP.

Optionally, the transmission resource includes a semi-static resource and/or a grant-free resource.

Optionally, the operation attribute is an uplink skip attribute.

Optionally, the transmission resource includes a dynamic scheduling resource, the target object or the user equipment is configured as UL Skip.

Optionally, the processing module is specifically used to: perform a deactivation function operation on all target objects configured as Skip; or,
perform a deactivation function operation on all target objects of the user equipment.

Optionally, performing a deactivation function operation on the target object includes any one of the following:
configuring a value of a deactivation timer for the target object as infinity;
shielding a deactivation operation triggered for the target object when the deactivation timer expires;
the deactivation timer not applicable to the target object;
configuring the target object to not allow deactivation;
extending or restarting the deactivation timer according to newly transmitted data and/or retransmitted data in the transmission resource.

Optionally, configuring the target object to not allow deactivation includes: configuring the user equipment to shield deactivation operation for the target object in a received deactivation command.

Optionally, the deactivation command may be transmitted through medium access control (MAC) control element (CE) or physical downlink control channel.

Optionally, the transmission resource includes an uplink transmission resource or a downlink transmission resource.

The user equipment provided in the embodiment of the present disclosure can implement various procedures implemented by the user equipment in the method embodiment of FIG. 1. To avoid repetition, details are not described herein again.

Figure 4:
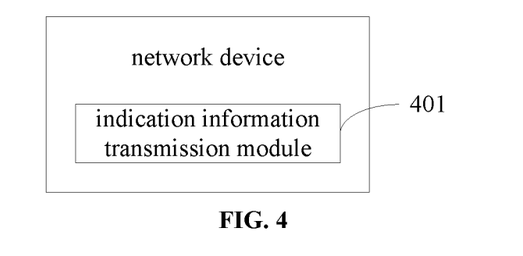
FIG. 4 is a first diagram of a network device according to an embodiment of the present disclosure.

Referring to FIG. 4, one embodiment of the present disclosure further provides a network device, and the network device includes:
an indication information transmission module 401 used to transmit indication information to a user equipment (UE), where the indication information includes at least one of a transmission resource and an operation attribute, the indication information is used to indicate the user equipment to perform a deactivation function operation on the target object when the transmission resource and/or the operation attribute are configured for the target object, and the target object is a cell, a carrier or a BWP.

Optionally, the transmission resource includes a semi-static resource and/or a grant-free resource.

Optionally, the operation attribute is an uplink skip attribute.

Optionally, the transmission resource includes a dynamic scheduling resource, the target object or the user equipment is configured as UL Skip.

Optionally, the indication information transmission module is specifically used to: indicate the user equipment to perform a deactivation function operation on all target objects configured as Skip; or
indicate the user equipment to perform a deactivation function operation on all target objects.

Optionally, indicating the user equipment to perform a deactivation function operation on the target object includes any one of the following:
indicating the user equipment to configure a value of a deactivation timer for the target object as infinity;
indicating the user equipment to shield a deactivation operation triggered for the target object when the deactivation timer expires;
the deactivation timer not applicable to the target object;
indicating the user equipment to configure the target object to not allow deactivation;
indicating the user equipment to extend or restart the deactivation timer according to newly transmitted data and/or retransmitted data in the transmission resource.

Optionally, the deactivation command may be transmitted through medium access control (MAC) control element (CE) or physical downlink control channel.

Optionally, the transmission resource includes an uplink transmission resource or a downlink transmission resource.

The network device provided in the embodiment of the present disclosure can implement various procedures implemented by the network device in the method embodiment of FIG. 2. To avoid repetition, details are not described herein again.

Figure 5:
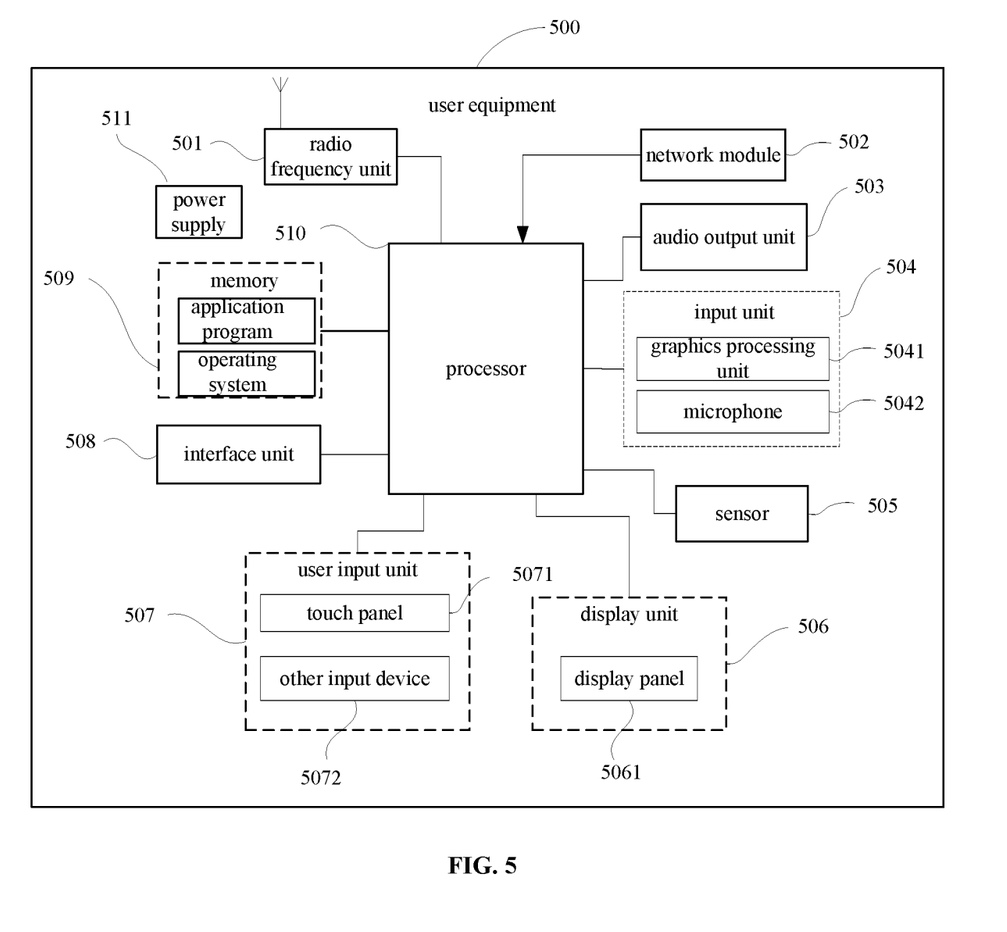
FIG. 5 is a second diagram of a user equipment according to an embodiment of the present disclosure.

FIG. 5 is a schematic diagram of a hardware structure of a user equipment that implements various embodiments of the present disclosure.

The user equipment 500 includes, but is not limited to, a radio frequency unit 501, a network module 502, an audio output unit 503, an input unit 504, a sensor 505, a display unit 506, a user input unit 507, an interface unit 508, a memory 509, a processor 510, and a power supply 511 and other components. It will be understood by those skilled in the art that structures of the user equipment shown in FIG. 5 do not constitute a limitation on the user equipment, and the user equipment may include more or less components than the illustration, or combine some components, or different component arrangement. In the embodiment of the present disclosure, the user equipment includes, but is not limited to, a mobile phone, a tablet computer, a notebook computer, a palmtop computer, a vehicle-mounted terminal, a wearable device, a pedometer, and the like.

The radio frequency unit 501 is used to receive configuration information transmitted by a network device, where the configuration information is used to indicate at least one of a transmission resource and an operation attribute.

The processor 510 is used to perform a deactivation function operation on the target object when the transmission resource and/or the operation attribute are configured for a target object, where the target object is a cell, a carrier or a BWP.

Optionally, the transmission resource includes a semi-static resource and/or a grant-free resource.

Optionally, the operation attribute is an uplink skip attribute.

Optionally, the transmission resource includes a dynamic scheduling resource, the target object or the user equipment is configured as UL Skip.

Optionally, the processor 510 is specifically used to: perform a deactivation function operation on all target objects configured as Skip; or, perform a deactivation function operation on all target objects of the user equipment.

Optionally, performing a deactivation function operation on the target object includes any one of the following:
configuring a value of a deactivation timer for the target object as infinity;

shielding a deactivation operation triggered for the target object when the deactivation timer expires;

the deactivation timer not applicable to the target object; configuring the target object to not allow deactivation;

extending or restarting the deactivation timer according to newly transmitted data and/or retransmitted data in the transmission resource.

Optionally, configuring the target object to not allow deactivation includes: configuring the user equipment to shield deactivation operation for the target object in a received deactivation command.

Optionally, the deactivation command may be transmitted through medium access control (MAC) control element (CE) or physical downlink control channel.

Optionally, the transmission resource includes an uplink transmission resource or a downlink transmission resource.

Because the deactivation function performed on the cell, the carrier or the BWP can be limited according to the transmission resources, this can effectively avoid the problem that if the PDCCH is lost, deactivation time of the cell, the carrier or the BWP expires and then a wrong deactivation operation is triggered, resulting delay in uplink transmission of the user equipment.

It should be understood that, in the embodiment of the present disclosure, the radio frequency unit 501 can be used for receiving and transmitting information, or receiving and transmitting signals during a call. Specifically, the radio frequency unit receives downlink data from the network device and then provides the data to the processor 510 for processing; and transmits uplink data to the network device. In general, the radio frequency unit 501 includes, but is not limited to, an antenna, at least one amplifier, a transceiver, a coupler, a low noise amplifier, a duplexer, and the like. In addition, the radio frequency unit 501 may also communicate with the network and other devices through a wireless communication system.

The user equipment provides the user with wireless broadband internet access through the network module 502, such as helping users to transmit and receive emails, browse web pages, and access streaming media.

The audio output unit 503 can convert audio data received by the radio frequency unit 501 or the network module 502 or stored in the memory 509 into an audio signal and output as a sound. Further, the audio output unit 503 may also provide audio output related to a particular function (for example, call signal reception sound, message reception sound, etc.) performed by the user equipment 500. The audio output unit 503 includes a speaker, a buzzer, a receiver, and the like.

The input unit 504 is used for receiving an audio or video signal. The input unit 504 may include a graphics processing unit (GPU) 5041 and a microphone 5042. The graphics processing unit 5041 processes image data of static pictures or videos obtained by an image capturing device (such as a camera) in a video capturing mode or an image capturing mode. The processed image frame can be displayed on the display unit 506. The image frames processed by the graphics processing unit 5041 may be stored in the memory 509 (or other storage medium) or transmitted via the radio frequency unit 501 or the network module 502. The microphone 5042 can receive sound and process such sound into audio data. The processed audio data can be converted into a format output that can be transmitted to the mobile communication network device via the radio frequency unit 501 in telephone call mode.

The user equipment 500 also includes at least one sensor 505, such as a light sensor, motion sensor and other sensors.

Specifically, the light sensor includes an ambient light sensor and a proximity sensor. The ambient light sensor can adjust the brightness of a display panel 5061 according to the brightness of the ambient light. The proximity sensor can turn off the display panel 5061 and/or the backlight when the user equipment 500 is moved to the ear. As one type of the motion sensor, an accelerometer sensor can detect the magnitude of acceleration in various directions (usually three axes), and can detect the magnitude and direction of gravity when stationary, and can be used to identify orientation of the user equipment (such as horizontal and vertical screen switching, related games, magnetometer attitude calibration) and identify related functions via vibration (such as pedometer, tapping). The sensor 505 may further include a fingerprint sensor, a pressure sensor, an iris sensor, a molecular sensor, a gyroscope, a barometer, a hygrometer, a thermometer, an infrared sensor and the like, which are not described here.

The display unit 506 may be used to display information inputted by the user, or information provided for the user. The display unit 560 may include a display panel 5061. Optionally, the display panel 5061 may be configured by using LCD, or Organic Light-Emitting Diode (OLED).

The user input unit 507 may be used to receive numeric or character information inputted by a user, and generate an input of signal, which is relevant with user settings and function control of the user equipment. Specifically, the user input unit 506 may include a touch panel 5071 and other input device 5072. The touch panel 5071, also referred to as touch screen, may collect touch operations of the user on or around the touch screen (e.g., a user's operations on the touch panel 5071 by using a finger, a touch pen, or any appropriate object or attachment), and drive a corresponding connection device, based on a preset program. The touch panel 5071 may include two parts, e.g., a touch detecting device, and a touch controller. The touch detecting device is used to detect a touch direction of a user, detect a signal from a touch operation, and transmit the signal to the touch controller. The touch controller is used to receive touch information from the touch detecting device, convert the touch information to contact coordinates, transmit the contact coordinates to the processor 510, receive and execute a command from the processor 510. In addition, the touch panel 5071 may be implemented by various types, such as, resistive, capacitive, infrared, and surface acoustic waves. In addition to the touch panel 5071, the user input unit 507 may also include other input device 5072, which may include, but is not limited to, a physical keyboard, function keys (such as volume control buttons, switch buttons, etc.), trackball, mouse, joystick, and the like.

Further, the touch panel 5071 may cover the display panel 5061. When the touch panel 5071 detects a touch operation on, or around it, transmits to the processor 510, so as to determine the type of the touch event. Subsequently, the processor 510 provides a corresponding visual output on the touch display based on the type of the touch event. Although in FIG. 5, the touch panel 5071 and the display panel 5061 are two independent components to implement the input and output functions of the user equipment, in a specific application, the touch panel 5071 and the display panel 5061 can be integrated to implement the input and output functions of the user equipment.

The interface unit 508 is an interface through which an external device is connected to the user equipment 500. For example, the external device may include a wired or wireless headset port, an external power (or battery charger) port, a wired or wireless data port, a memory card port, a port for connecting a device having an identification module, an audio input/output (I/O) port, video I/O port, headphone port. The interface unit 508 can be used to receive input from an external device (such as data information, power) and the received input may be transmitted to one or more components within the user equipment 500, or can be used to transmit data between the user equipment 500 and the external device.

The memory 509 can be used to store software programs as well as various data. The memory 509 may mainly include a storage program area and a storage data area. The storage program area may store an operating system, an application required for at least one function (such as a sound playing function, an image playing function, etc.). The storage data area may store data created (such as audio data, phone book) when a mobile phone is used. Further, the memory 509 may include a high speed random access memory, and may also include a nonvolatile memory such as at least one magnetic disk storage device, flash memory device, or other volatile solid state storage device.

The processor 510 is a control center of the user equipment 500. The processor 510 connects each part of the whole user equipment, by using various interfaces and lines. The processor 5100 performs various functions of the user equipment, and processes data, by running or executing software programs, and/or, modules in the memory 509, and calls data in the memory 509, so as to perform an overall monitor on the user equipment. Optionally, the processor 510 may include one or more processing units. Preferably, the processor 510 may integrate an application processor and a modem processor. The application processor mainly processes the operating system, the user interface, applications, etc. the modem processor mainly handles wireless communication. It can be understood that the above modem processor may not be integrated into the processor 510.

The user equipment 500 may further include a power source 511 (such as a battery) for supplying power to the various components. Preferably, the power source 511 may be logically connected to the processor 510 through a power management system to manage charging, discharging, and power management through the power management system.

In addition, the user equipment 500 includes some functional modules not shown, and details are not described herein again.

Optionally, one embodiment of the present disclosure further provides a user equipment, including a processor 510, a memory 509 and a computer program stored on the memory 509 and executable on the processor 510. The computer program is executed by the processor 510 to implement various procedures of the activation control method in the above embodiment and the same technical effects can be achieved. To avoid repetition, details are not described herein again.

One embodiment of the present disclosure further provides a computer readable storage medium. The computer readable storage medium stores a computer program. The computer program is executed by a processor to implement various procedures of the activation control method in the above embodiment and the same technical effects can be achieved. To avoid repetition, details are not described herein again. The computer readable storage medium may be, for example, a read-only memory (ROM), a random access memory (RAM), a magnetic disk, or an optical disk.

Figure 6:
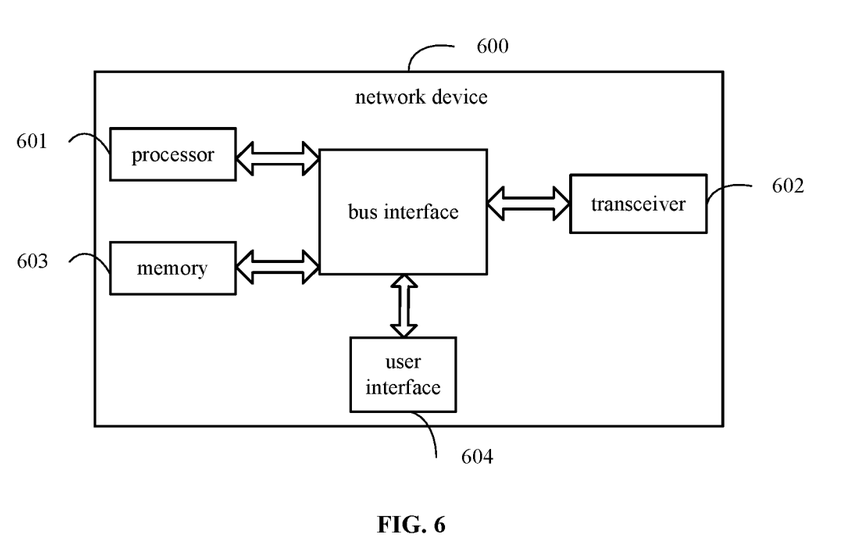
FIG. 6 is a second diagram of a network device according to an embodiment of the present disclosure.

Referring to FIG. 6, FIG. 6 is a diagram of a network device according to an embodiment of the present disclosure, which can implement the details of the activation control method in the foregoing embodiment and achieve the same effect. As shown in FIG. 6, the network device 600 includes a processor 601, a transceiver 602, a memory 603, a user interface 604 and a bus interface.

The processor 601 is used to read a program in the memory 603 and execute the following process: transmitting indication information to a user equipment (UE), where the indication information includes at least one of a transmission resource and an operation attribute, the indication information is used to indicate the user equipment to perform a deactivation function operation on the target object when the transmission resource and/or the operation attribute are configured for the target object, and the target object is a cell, a carrier or a BWP.

In FIG. 6, the bus architecture may include any number of interconnected buses and bridges. Specifically, one or more processors demonstrated with processor 601 are coupled with various circuits of memory, which is demonstrated with memory 603. The bus architecture may also link various other circuits, such as, peripherals, voltage regulators, and power management circuits, as is known in the art. Thus, in the application, no further description is provided. The bus interface provides an interface. The transceiver 602 may be composed of multiple components, that is, including a transmitter and a receiver, which provide a unit for communicating with various other devices via the transmitting medium.

For different user equipment, the user interface 604 may also be an interface capable of externally/internally connecting required devices which include but not limited to a keypad, a display, a speaker, a microphone, a joystick.

The processor 601 is in charge of managing bus architecture and general processing. The memory 603 may store data used when the processor 601 performs operations.

Optionally, the transmission resource includes a semi-static resource and/or a grant-free resource.

Optionally, the operation attribute is an uplink skip attribute.

Optionally, the transmission resource includes a dynamic scheduling resource, the target object or the user equipment is configured as UL Skip.

Optionally, the program is executed by the processor 601 to implement the following steps: indicating the user equipment to perform a deactivation function operation on all target objects configured as Skip; or
  indicating the user equipment to perform a deactivation function operation on all target objects.

Optionally, indicating the user equipment to perform a deactivation function operation on the target object includes any one of the following:
  indicating the user equipment to configure a value of a deactivation timer for the target object as infinity;
  indicating the user equipment to shield a deactivation operation triggered for the target object when the deactivation timer expires;
  the deactivation timer not applicable to the target object;
  indicating the user equipment to configure the target object to not allow deactivation;
  indicating the user equipment to extend or restart the deactivation timer according to newly transmitted data and/or retransmitted data in the transmission resource.

Optionally, indicating the user equipment to configure the target object to not allow deactivation includes:
  indicating the user equipment to configure the user equipment to shield deactivation operation for the target object in a received deactivation command.

Optionally, the deactivation command may be transmitted through medium access control (MAC) control element (CE) or physical downlink control channel.

Optionally, the transmission resource includes an uplink transmission resource or a downlink transmission resource.

Thus, in this embodiment, the indication information is transmitted to the user equipment, and the indication information includes at least one of the transmission resource and the operation attribute, the indication information is used to indicate the user equipment to perform a deactivation function operation on the target object when the transmission resource and/or the operation attribute are configured for the target object, and the target object is a cell, a carrier or a BWP. Since the network device can indicate the deactivation function performed by the user equipment on the cell, the carrier or the BWP according to the transmission resource, this can effectively avoid the problem that if the PDCCH is lost, deactivation time of the cell, the carrier or the BWP expires and then a wrong deactivation operation is triggered, resulting delay in uplink transmission of the user equipment.

Persons having ordinary skill in the art may learn that, taking into account various embodiments of the present disclosure, units and algorithm blocks described in each example may be implemented by electronic hardware, or in a combination of computer software and electronic hardware. Whether these functions are implemented by using hardware or software depends on specific application, and design constraints of the technical solution. A skilled person may adopt different methods to implement described functions of each specific application, but such implementation should not be considered to extend beyond the scope of the present disclosure.

Persons having ordinary skill in the art may clearly understand that, for convenient and concise of the description, specific work process of foregoing system, device and unit may refer to a corresponding process in method embodiments, which are not repeated here.

In the embodiments of the application, it should be understood that, the disclosed device and method may be implemented by using other methods. For example, device embodiments described above are only illustrative, e.g., division of the unit is only a logical division, there may be additional division methods during actual implementation. For example, multiple units or components may be combined, or integrated into another system. Alternatively, some features may be omitted, or not performed. From another point of view, the mutual coupling shown or discussed, or direct coupling, or communication connection may be through some interfaces. The indirect coupling, or communication connection among devices or units may be electronic, mechanical, or in other form.

Units described as separate components may be, or may be not physically separated. Components, displayed as units, may be or may be not a physical unit, which may be located in one place, or may be distributed to multiple network units. Some units, or all the units may be selected to implement the objectives of the solution in the embodiment, based on actual requirements.

In addition, in various embodiments of the present disclosure, each functional unit may be integrated into one processing unit. Alternatively, each unit may exist physically alone. Still alternatively, two or more units may be integrated into one unit.

When the functions are implemented in the form of a software functional unit, and sold or used as an independent product, such software functional unit may be stored in a computer readable storage medium. On the basis of such understanding, essence of technical solution in the present disclosure, or a part thereof contributing to the existing technology, or just a part of the technical solution may be demonstrated with a software product. The computer software product is stored in a storage medium, which includes several instructions to enable a computer device (which may be a Personal Computer (PC), a server, or a network device, and so on) to execute all the blocks, or some blocks in a method of each embodiment in the present disclosure. The foregoing storage medium includes a U disk, a mobile hard disk, a Read-Only Memory (ROM), a Random Access Memory (RAM), a disk, or a Compact Disk (CD), or various mediums which may store program codes.

Foregoing describes optional implementation modes of the present disclosure, but the protection scope of the present disclosure is not limited to this. For persons having ordinary skill in the art, several improvements and changes may be made, without departing from the principle of the present disclosure. These improvements and changes should also be within the scope of the present disclosure. Therefore, the protection scope of the present disclosure shall be subject to the protection scope of the claims.

What is claimed is:

1. An activation control method comprising:
receiving configuration information transmitted by a network device, wherein the configuration information is used to indicate at least one of a transmission resource and an operation attribute;
when the transmission resource and/or the operation attribute are configured for a target object, performing a deactivation function operation on the target object; wherein the target object is a cell, a carrier or a bandwidth part (BWP);
wherein the transmission resource is a resource associated with a new transmission and/or a retransmission;
wherein the performing a deactivation function operation on the target object comprises: extending or restarting the deactivation timer according to newly transmitted data and/or retransmitted data in the transmission resource.

2. The method according to claim 1, wherein the transmission resource comprises a semi-static resource and/or a grant-free resource.

3. The method according to claim 1, wherein the operation attribute is an uplink skip attribute.

4. The method according to claim 3, wherein the transmission resource comprises a dynamic scheduling resource, the target object or the user equipment is configured as UL Skip.

5. The method according to claim 4, wherein the performing a deactivation function operation on the target object comprises:
performing a deactivation function operation on all target objects configured as Skip; or,
performing a deactivation function operation on all target objects of the user equipment.

6. The method according to claim 1, wherein the transmission resource comprises an uplink transmission resource or a downlink transmission resource.

7. An activation control method comprising:
transmitting indication information to a user equipment (UE); wherein the indication information comprises at least one of a transmission resource and an operation attribute, the indication information is used to indicate the user equipment to perform a deactivation function operation on the target object when the transmission resource and/or the operation attribute are configured for the target object, and the target object is a cell, a carrier or a BWP, the transmission resource is a resource associated with a new transmission and/or a retransmission;

wherein indicating the user equipment to perform a deactivation function operation on the target object comprises: indicating the user equipment to extend or restart the deactivation timer according to newly transmitted data and/or retransmitted data in the transmission resource.

8. The method according to claim 7, wherein the transmission resource comprises a semi-static resource and/or a grant-free resource.

9. The method according to claim 7, wherein the operation attribute is an uplink skip attribute.

10. The method according to claim 9, wherein the transmission resource comprises a dynamic scheduling resource, the target object or the user equipment is configured as UL Skip.

11. The method according to claim 10, wherein indicating the user equipment to perform a deactivation function operation on the target object comprises:

indicating the user equipment to perform a deactivation function operation on all target objects configured as Skip; or indicating the user equipment to perform a deactivation function operation on all target objects.

12. The method according to claim 7, wherein the transmission resource comprises an uplink transmission resource or a downlink transmission resource.

13. A user equipment comprising:
one or more processors;
a memory; and
one or more programs; wherein the one or more computer programs are stored in the memory and configured to be executed by the one or more processors, the computer program is executed to implement steps of the method according to claim 1.

14. A user equipment comprising:
one or more processors;
a memory; and
one or more programs; wherein the one or more computer programs are stored in the memory and configured to be executed by the one or more processors, the computer program is executed to implement steps of the method according to claim 10.

15. A user equipment comprising:
one or more processors;
a memory; and
one or more programs; wherein the one or more computer programs are stored in the memory and configured to be executed by the one or more processors, the computer program is executed to implement steps of the method according to claim 2.

16. A user equipment comprising:
one or more processors;
a memory; and
one or more programs; wherein the one or more computer programs are stored in the memory and configured to be executed by the one or more processors, the computer program is executed to implement steps of the method according to claim 3.

17. A user equipment comprising:
one or more processors;
a memory; and
one or more programs; wherein the one or more computer programs are stored in the memory and configured to be executed by the one or more processors, the computer program is executed to implement steps of the method according to claim 4.

18. A user equipment comprising:
one or more processors;
a memory; and
one or more programs; wherein the one or more computer programs are stored in the memory and configured to be executed by the one or more processors, the computer program is executed to implement steps of the method according to claim 5.

19. A user equipment comprising:
one or more processors;
a memory; and
one or more programs; wherein the one or more computer programs are stored in the memory and configured to be executed by the one or more processors, the computer program is executed to implement steps of the method according to claim 8.

* * * * *